United States Patent Office 2,853,512
Patented Sept. 23, 1958

2,853,512

PROCESS FOR THE MANUFACTURE OF POLYENE ALDEHYDES AND INTERMEDIATES THEREFOR

Otto Isler, Basel, and Paul Zeller, Neuallschwil, Basel-Land, Switzerland, assignors to Hoffmann-La Roche Inc., Nutley, N. J., a corporation of New Jersey No Drawing. Application July 29, 1955
Serial No. 525,394

9 Claims. (Cl. 260—476)

The novel invention disclosed herein relates to polyene aldehydes, a method for preparing the same and to intermediate products produced in the synthesis of the said polyene aldehydes. More particularly, the invention provides the aldehydes 8-[2,6,6-trimethylcyclohexen-(2)-ylidene] - 2,6 - dimethyl - octadien - (2,6) - yne - (4)-al-(1) and 8 - [2,6,6 - trimethylcyclohexen - (2) - ylidene]-2,6 - dimethyl - octatrien - (2,4,6) - al - (1), which may also be called succinctly retrodehydro-$C_{19}$-acetylene-aldehyde or retrodehydro-$C_{19}$-aldehyde, respectively. These aldehydes have an intense yellow color and, in view of their solubility in fats and oils, may be used as coloring agents for fats and oils. Furthermore, they may be converted to carotenoids, for example into bis-hydro-$\beta$-carotene or 4,4'-dihydroxy-$\beta$-carotene, by condensing the same with acetylene by means of a metal-organic reaction, by allyl rearrangement and, if desired, dehydration, and by partial hydrogenation.

A comprehensive embodiment of the process provided by the invention comprises condensing 5-[2,6,6-trimethyl-cyclohexen - (1) - yl] - 3 - methyl - 3 - hydroxy - penten-(4)-yne-(1)—hereinafter called $\beta$-$C_{15}$-acetylene carbinol—by means of a metal-organic reaction with an ether or an ester of 2-methyl-3-hydroxy-propen-(2)-al-(1), treating the 1-ether or 1-ester, respectively, of 8-[2,6,6-trimethyl - cyclohexen - (1) - yl] - 2,6 - dimethyl - 1,3,6-trihydroxy - octadien - (1,7) - yne - (4) obtained—called hereinafter $C_{19}$-dihydroxyenolester or $C_{19}$-dihydroxyenolether, respectively—by means of an acid agent to effect allyl rearrangement, dehydration and hydrolysis, whereupon the 8 - [2,6,6 - trimethylcyclohexen - (2) - ylidene]-2,6 - dimethyl - octadien - (2,6) - yne - (4) - al - (1) formed may be partially hydrogenated at its triple bond.

A further aspect of the invention relates to lower alkyl ethers of 8 - [2,6,6 - trimethylcyclohexen - (1) - yl] - 2,6-dimethyl - 1,3,6 - trihydroxy - octadien - (1,7) - yne - (4) and to a process for preparing the same which comprises reacting 5 - [2,6,6 - trimethyl - cyclohexen - (1) - yl] - 3-methyl - 3 - hydroxy - penten - (4) - yne - (1) with an alkylmagnesium halide, for example ethylmagnesium bromide, in the proportion of 1 mol to 2 mols, condensing the reaction product with a 2-methyl-3-lower-alkoxy-propen-(2)-al-(1) and hydrolyzing the condensation product.

Still another aspect of the invention relates to acyl esters of 8 - [2,6,6 - trimethyl - cyclohexen - (1) - yl]-2,6 - dimethyl - (1,3,6) - trihydroxy - octadien - (1,7)-yne-(4) and to a process for preparing the same which comprises reacting 5 - [2,6,6 - trimethyl - cyclohexen-(1) - yl] - 3 - methyl - 3 - hydroxy - penten - (4) - yne-(1) with a lower alkylmagnesium halide, for example ethylmagnesium bromide, in the proportion of 1 mol to 2 mols, condensing the reaction product with a 2-methyl-3-acyloxy-propen-(2)-al-(1) and hydrolyzing the condensation product.

The starting materials for the processes and methods disclosed in the present application may be prepared as follows:

$\beta$-$C_{15}$-acetylene carbinol of melting point 20.5° and boiling point 84°/0.5 mm. Hg, $n_D^{20}=1.5024$ is produced by reacting $\beta$-ionone with lithiumacetylide in liquid ammonia.

2-methyl-3-acyloxy-propen-(2)-al-(1) may be prepared by reacting the sodium salt of methyl-malonic dialdehyde with an acid chloride in an inert water-free solvent. Thus, 2-methyl-3-benzoyloxy-propen-(2)-al-(1) of melting point 81–82° can be prepared by dropwise addition of benzoyl chloride to a suspension of the finely powdered sodium salt of methylmalonic dialdehyde in methylene chloride, refluxing the mixture, separating the sodium chloride formed by filtration, concentrating the filtrate and purifying the crystallized 2-methyl-3-benzoyloxypropen-(2)-al-(1) by recrystallization from a mixture of methylene chloride and petroleum ether.

2-methyl-3-acetoxy-propen-(2)-al-(1) of boiling point 75–77°/10 mm. Hg and $n_D^{20}=1.4690$ may be prepared in the same manner. It can suitably be purified by distillation; upon cooling, it solidifies.

2-methyl-3-lower-alkoxy-propen-(2)-al-(1) may be produced by reacting methyl-malonic dialdehyde with an alcohol at elevated temperature and in the presence of an acid catalyst. Thus, 2-methyl-3-isopropyloxy-propen-(2)-al-(1) may for example be prepared by heating a mixture of methyl-malonic dialdehyde, isopropanol, benzene and a minute amount of p-toluene sulfonic acid, the water formed being continuously azeotropically distilled off and separated off in a water separator. Once the reaction is completed, the catalyst is neutralized and the reaction product purified by distillation; boiling point 83°/13 mm. Hg, $n_D^{21}=1.4745$. 2-methyl-3-ethoxy-propen-(2)-al-(1) may be prepared in an analogous manner; boiling point 78–80°/13 mm. Hg, $n_D^{24}=1.4755$.

The sodium salt of methyl-malonic dialdehyde required may be produced by condensation of a propenyl ether with orthoformic acid ethylester by means of borontrifluoride etherate to form the tetraethylacetal of methyl-malonic dialdehyde, hydrolysis to methyl-malonic dialdehyde and neutralization with aqueous sodium hydroxide. To isolate the sodium salt, the aqueous solution is concentrated to dryness and the residue crystallized in alcohol.

In a particularly suitable mode of procedure for the first stage of the comprehensive synthesis, i. e. for the preparation of the $C_{19}$-dihydroxy-enolester or, respectively, $C_{19}$-dihydroxy-enolether, diethylether is used as reaction medium and the reaction mixture is refluxed to complete the condensation. The reaction mixture is then hydrolyzed, preferably with aqueous sodiumacetate solution at a temperature of 0–10°. The $C_{19}$-dihydroxyenolester or, respectively, $C_{19}$-dihydroxyenolether is produced in the form of a viscous oil, which shows two active hydrogen atoms according to Zerewitinoff and which has in ultraviolet spectrum an absorption maximum at 236 m$\mu$ (in alcohol).

In the second stage of the comprehensive synthesis, the $C_{19}$-dihydroxyenolester or, respectively, the $C_{19}$-dihydroxyenolether is treated with an acid agent to split off the tertiary hydroxyl group with allylic rearrangement, the retro-configuration being thereby formed. At the same time, the ester or, respectively, ether group is hydrolyzed under formation of the retrodehydro-$C_{19}$-acetylene-aldehyde. A particularly suitable mode of procedure of this second stage of the comprehensive synthesis comprises refluxing the crude $C_{19}$-dihydroxyenolester or, respectively, $C_{19}$-dihydroxy-enolether in aqueous acetone with sulfuric acid. Preferably, this reaction is carried out in a homogeneous medium and in the absence of air. The crude retrodehydro-$C_{19}$-acetylene-aldehyde obtained may be purified by crystallization in petroleum ether or in methanol at low temperature. The pure aldehyde forms yellow crystals of melting point 60–62°, which show in the ultraviolet spectrum absorption maxima in petroleum ether at 270 and 374 m$\mu$,$\epsilon$=13,540 and 30,000.

Dinitrophenylhydrazone, melting point 219–220° (from acetone).

Phenylhydrazone, melting point 105–106° (from alcohol).

Phenylsemicarbazone, melting point 173–174° (from methanol).

Azine, melting point 142–144° (from methanol).

Additionally, the retrodehydro-$C_{19}$-acetylene-aldehyde may be partially hydrogenated at its triple bond to retrodehydro-$C_{19}$-aldehyde. This may suitably be performed by hydrogenating the crystallized retrodehydro-$C_{19}$-acetylene-aldehyde in petroleum ether, in the presence of a minute amount of quinoline and of a palladium lead catalyst. The hydrogenation product, which represents a cis-form of the retrodehydro-$C_{19}$-aldehyde may be isolated as such and shows in the ultraviolet spectrum the typical cis-peak at 270 m$\mu$, characteristic for this kind of polyene compounds.

Upon heating the hydrogenation product, or upon treating the same with a trace of iodine, it is converted into a mixture of an oily and of a solid form; the solid form melts at 105–107°; ultraviolet maxima at 303, 385 and 403 m$\mu$,$\epsilon$=30,000, 28,800 and 23,500 (in petroleum ether), phenylsemicarbazone, melting point 187–189°.

EXAMPLE 1

*$C_{19}$-dihydroxyenolester*

To a Grignard solution—prepared by reacting 11 parts by weight of magnesium with 39 parts by volume of ethyl bromide in 200 parts by volume of ether—is added dropwise a solution of 43 parts by weight of 5-[2,6,6-trimethylcyclohexen-(1)-yl]-3 - methyl - 3 - hydroxy-penten-(4)-yne-(1) in 100 parts by volume of ether at such a rate as to keep the mixture boiling. As soon as the addition is completed, the mixture is refluxed for further two hours and then cooled down. While very energetically stirring, a solution of 36 parts by weight of 2-methyl-3-benzoyloxy-propen-(2)-al-(1) in 550 parts by volume of ether is added within 10 minutes, whereupon the mixture is refluxed for a further hour. The reaction mixture is then cooled down with ice water and a solution of 60 parts by weight of ammonium acetate in 350 parts by volume of water is added slowly. The light yellow ether layer is then separated from the aqueous layer, washed with a solution of sodium bicarbonate and dried with sodium sulfate. The sodium sulfate is filtrated off and the ether evaporated in vacuo. The residue consists of 80.5 parts by weight of 8-[2,6,6-trimethyl-cyclohexen-(1)-yl]-2,6-dimethyl-3,6-dihydroxy - 1-benzoyloxy-octadien - (1,7)-yne-(4) in the form of a viscous honey-like oil, which shows two active hydrogen atoms according to Zerewitinoff and which in the ultraviolet spectrum has an absorption maximum at 236 m$\mu$,$\epsilon$=20,000 (in alcohol).

*Retrodehydro-$C_{19}$-acetylene-aldehyde*

80.5 parts by weight of 8-[2,6,6-trimethyl-cyclohexen-(1)-yl]-2,6-dimethyl-3,6-dihydroxy-1 - benzoyloxy - octadien-(1,7)-yne-(4) are dissolved in a mixture of 300 parts by volume of acetone and 10 parts by volume of 20 percent sulfuric acid, whereupon a minute amount of hydroquinone is added and the mixture is refluxed for 2 hours on a steam bath in a nitrogen atmosphere. The reaction product which has become dark-colored is poured on ice water, then taken up in ether and freed from the benzoic acid by agitating with a sodium bicarbonate solution. The ether solution is dried, filtrated and concentrated to produce 50–55 parts by weight of a viscous oil which is taken up in about 100 parts by volume of low boiling petroleum ether. By external cooling by means of solid carbon dioxide in acetone, part of the 8-[2,6,6-trimethyl-cyclohexen-(2)-yliden]-2,6 - dimethyl-octadien-(2,6)-yne-(4)-al-(1) formed crystallizes. This product is sucked off, washed with cold petroleum ether and dried in vacuo at 30–40°; yield: 22 parts by weight of melting point 55–58°. Upon recrystallizing from petroleum ether or methanol, the melting point rises to 60–62°. Ultraviolet absorption maxima at 270 m$\mu$,$\epsilon$=13,540 and 374 m$\mu$,$\epsilon$=30,000 (in petroleum ether). The aldehyde may be distilled in high vacuo (boiling point 155°/0.02 mm. Hg). The mother liquor of crystallization still contains a substantial proportion of the aldehyde.

*Retrodehydro-$C_{19}$-aldehyde*

24 parts by weight of 8-[2,6,6-trimethyl-cyclohexen-(2) - yliden] - 2,6-dimethyl-octadien-(2,6)-yne-(4)-al-(1) are dissolved in 150 parts by volume of low boiling petroleum ether and hydrogenated at room temperature under atmospheric pressure in the presence of 0.5 part by volume of quinoline and of 5 parts by weight of a 5 percent palladium lead catalyst. As soon as the amount of hydrogen calculated for one mol has been absorbed, the hydrogenation is interrupted, the catalyst is filtrated off and the solution concentrated in vacuo at low temperature. The 8-[2,6,6-trimethyl-cyclohexen-(2)-yliden]-2,6-dimethyl-octatrien - (2,4,6) - al - (1) remaining back shows in the ultraviolet spectrum absorption maxima at 270, 381 and 402 m$\mu$, $\epsilon$=18,600, 34,750 and 28,400 (in petroleum ether).

By distillation in high vacuo, this crude product yields a low boiling fraction (boiling point 120–130°/0.015 mm. Hg) which may be crystallized in petroleum ether (melting point 105–107°), and a high boiling fraction (boiling point 150–155°/0.01 mm. Hg), which shows absorption maxima in the ultraviolet spectrum at 273, 381 and 401 m$\mu$.

EXAMPLE 2

*$C_{19}$-dihydroxyenolether*

To a Grignard solution—prepared by reacting 11 parts by weight of magnesium with 39 parts by volume of ethyl bromide in 200 parts by volume of ether—is added dropwise a solution of 43 parts by weight of 5-[2,6,6-trimethyl-cyclohexen-(1)-yl] - 3 - methyl - 3 - hydroxy-penten-(4)-yne-(1) in 100 parts by volume of ether at such a rate as to keep the mixture boiling. As soon as the addition is completed, the mixture is refluxed for 2 further hours and then cooled down. A solution of 24.5 parts by weight of 2-methyl-3-ethoxy-propen-(2)-al-(1) in 100 parts by volume of ether is added within 10 minutes and the mixture is refluxed for a further hour. The reaction mixture is then cooled down with ice water and added slowly with a solution of 60 parts by weight of ammonium acetate in 350 parts by volume of water. As soon as the addition is completed, the light yellow ether layer is separated from the water layer, washed with a sodium bicarbonate solution and dried with sodium sulfate. The drying agent is filtrated off and the ether is eliminated in vacuo. 65 parts by weight of 8-[2,6,6-trimethyl-cyclohexen-(1)-yl]-2,6 - dimethyl - 3,6-dihydroxy-1-ethoxy-octadien-(1,7)-yne-(4) remain back in the form of a viscous honey-like oil, which shows two active hydrogen atoms according to Zerewitinoff and which in the ultraviolet spectrum shows a maximum of absorption at 236 m$\mu$, $\epsilon$=20,000 (in alcohol). This product is hydrolyzed and rearranged to the retrodehydro-$C_{19}$-acetylene-aldehyde as described in Example 1.

We claim:

1. A process for preparing polyene aldehydes, which comprises condensing 5-[2,6,6-trimethyl-cyclohexen-(1)-yl]-3-methyl-3-hydroxy-penten-(4)-yne-(1) with a compound having the formula

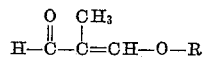

wherein R represents a member selected from the group consisting of lower alkyl, lower alkanoyl and benzoyl, and heating the condensation product obtained with an aqueous solution of sulfuric acid to effect allyl rearrangement, dehydration and hydrolysis to form 8-[2,6,6-trimethyl-cyclohexen-(2)-ylidene]-2,6 - dimethyl - octadien-(2,6)-yne-(4)-al-(1).

2. 8-[2,6,6-trimethyl-cyclohexen - (2) - ylidene] - 2,6-dimethyl-octadien-(2,6)-yne-(4)-al-(1).

3. The process of claim 1, which comprises the further step of partially hydrogenating the 8-[2,6,6-trimethyl-cyclohexen-(2)-ylidene]-2,6 - dimethyl - octadien - (2,6)-yne-(4)-al-(1) by reacting it with approximately one molar proportion of elemental hydrogen in the presence of a palladium-lead hydrogenation catalyst to produce 8-[2,6,6-trimethyl-cyclohexen-(2)-ylidene] - 2,6-dimethyl-octatrien-(2,4,6)-al-(1).

4. 8-[2,6,6 - trimethyl - cyclohexen - (1) - yl] - 2,6-dimethyl-1-lower-alkoxy - (3,6) - dihydroxy - octadien-(1,7)-yne-(4).

5. 8-[2,6,6-trimethylcyclohexen - (1)-yl] - 2,6-dimethyl-(1)-acyloxy - 3,6 - dihydroxy-octadien - (1,7) - yne - (4), wherein the acyloxy radical is selected from the group consisting of lower alkanoyloxy and benzoyloxy.

6. A process which comprises refluxing 8-[2,6,6-trimethyl - cyclohexen - (1) - yl] - 2,6 - dimethyl - 1 - lower-alkoxy-3,6-dihydroxy-octadien-(1,7)-yne - (4) with sulfuric acid in aqueous acetone.

7. 8 - [2,6,6 - trimethyl - cyclohexen - (1) - yl] - 2,6-dimethyl - (1) - benzoyloxy - 3,6 - dihydroxy - octadien-(1,7)-yne-(4).

8. A process which comprises hydrolyzing 8-[2,6,6-trimethyl-cyclohexen - (1) - yl] - 2,6 - dimethyl - (1)-acyloxy-3,6-dihydroxy-octadien - (1,7) - yne-(4), wherein the acyloxy radical is selected from the group consisting of lower alkanoyloxy and benzoyloxy, by heating it with an aqueous solution of sulfuric acid, thereby forming 8-[2,6,6 - trimethyl - cyclohexen - (2) - ylidene] - 2,6-dimethyl-octadien-(2,6)-yne-(4)-al-(1).

9. A process which comprises hydrolyzing 8-[2,6,6-trimethyl-cyclohexen-(1)-yl]-2,6-dimethyl-1-lower alkoxy-(3,6)-dihydroxy-octadien-(1,7)-yne-(4) by heating it with an aqueous solution of sulfuric acid thereby forming 8-[2,6,6-trimethyl-cyclohexen-(2)-ylidene] - 2,6-dimethyl-octadien-(2,6)-yne-(4)-al-(1).

References Cited in the file of this patent

UNITED STATES PATENTS

| | | |
|---|---|---|
| 2,382,085 | Milas | Aug. 14, 1945 |
| 2,671,112 | Inhoffen et al. | Mar. 2, 1954 |
| 2,676,988 | Robeson et al. | Apr. 27, 1954 |
| 2,676,990 | Humphlett et al. | Apr. 27, 1954 |

OTHER REFERENCES

Inhoffen et al.: Justus Liebigs Annalen der Chemie 570, 54–69 (1950).